(12) United States Patent
Heuschen et al.

(10) Patent No.: US 9,573,153 B2
(45) Date of Patent: Feb. 21, 2017

(54) COATING INSTALLATION AND CORRESPONDING OPERATING METHOD

(71) Applicant: Dürr Systems GmbH, Bietigheim-Bissingen (DE)

(72) Inventors: Wulf Heuschen, Remseck-Hochberg (DE); Hartmut Kmitta, Ditzingen (DE); Marc Furmannek, Stuttgart (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/364,878

(22) PCT Filed: Dec. 10, 2012

(86) PCT No.: PCT/EP2012/005091
§ 371 (c)(1),
(2) Date: Jun. 12, 2014

(87) PCT Pub. No.: WO2013/087186
PCT Pub. Date: Jun. 20, 2013

(65) Prior Publication Data
US 2014/0331922 A1    Nov. 13, 2014

(30) Foreign Application Priority Data

Dec. 16, 2011    (DE) .................. 10 2011 121 343

(51) Int. Cl.
*B05B 15/12* (2006.01)
*B05B 13/02* (2006.01)
(Continued)

(52) U.S. Cl.
CPC ......... *B05B 15/1207* (2013.01); *B05B 13/005* (2013.01); *B05B 13/0431* (2013.01);
(Continued)

(58) Field of Classification Search
CPC ... B05B 15/1207; B05B 15/1292; B05B 13/02
(Continued)

(56) References Cited

U.S. PATENT DOCUMENTS 4,231,289 A * 11/1980 Domicent .................. 454/52
4,664,061 A *  5/1987 Morioka et al. .......... 118/663
(Continued)

FOREIGN PATENT DOCUMENTS

CN    2528547 Y    1/2003
CN    2584293 Y    11/2003
(Continued)

OTHER PUBLICATIONS

Meaning of the word "transverse" from Wiktionary, https://en.m.wiktionary.org, No date.*
PCT International Search Report and Written Opinion (5 pages).

*Primary Examiner* — Yewebdar Tadesse
(74) *Attorney, Agent, or Firm* — Bejin Bieneman, PLC

(57) ABSTRACT

The invention relates to a coating installation (1) for coating components (3, 5), in particular for painting aircraft components, having a first coating booth (2), in particular for coating large aircraft components (3), a multi-axis coating robot (7) that positions a coating device, in particular a rotary atomizer, a travel axis (8) for moving the coating robot (7) along the travel axis (8), the travel axis (8) running within the first coating booth (2), and a second coating booth (4), in particular for coating small aircraft components (5). According to the invention, the travel axis (8) for the first coating robot (7) extends as far as into the second coating booth (4), such that the coating robot (7) can optionally coat components (3, 5) in the first coating booth (2) or in the second coating booth (4).

18 Claims, 5 Drawing Sheets

(51) Int. Cl.
   *B05B 3/00* (2006.01)
   *B65G 47/22* (2006.01)
   *B05B 13/00* (2006.01)
   *B05B 13/04* (2006.01)
   *B25J 5/02* (2006.01)
   *B25J 9/00* (2006.01)
   *B25J 11/00* (2006.01)
(52) U.S. Cl.
   CPC ...... *B05B 15/1225* (2013.01); *B05B 15/1292* (2013.01); *B25J 5/02* (2013.01); *B25J 9/0084* (2013.01); *B25J 9/0093* (2013.01); *B25J 11/0075* (2013.01)
(58) Field of Classification Search
   USPC ............ 118/326, 309, 634, 50, 324, DIG. 7, 323,118/321; 454/50, 53; 55/DIG. 46; 198/456, 198/457.1, 370.01, 370.02, 369.1
   See application file for complete search history.

(56) References Cited

U.S. PATENT DOCUMENTS

| | | | |
|---|---|---|---|
| 4,768,462 A | 9/1988 | Kuronaga et al. | |
| 5,085,374 A | 2/1992 | Okuda et al. | |
| 5,113,785 A * | 5/1992 | Martin | H05K 13/0061 118/324 |
| 5,221,347 A * | 6/1993 | Heine | 118/630 |
| 8,627,780 B2 | 1/2014 | Herre et al. | |
| 2002/0045954 A1 * | 4/2002 | Nose et al. | 700/17 |
| 2004/0262124 A1 * | 12/2004 | Muchalov | B65G 47/71 198/371.2 |
| 2007/0062060 A1 * | 3/2007 | Swoboda | 34/275 |
| 2007/0095279 A1 | 5/2007 | Langeman | |
| 2008/0060575 A1 | 3/2008 | Meissner | |
| 2010/0047465 A1 | 2/2010 | Ansorge et al. | |
| 2011/0166708 A1 * | 7/2011 | Herre et al. | 700/258 |
| 2011/0250360 A1 | 10/2011 | Koermoci et al. | |
| 2012/0031952 A1 * | 2/2012 | Hattori et al. | 228/9 |

FOREIGN PATENT DOCUMENTS

| | | |
|---|---|---|
| CN | 101626839 A | 1/2010 |
| DE | 241374 A1 | 12/1986 |
| DE | 241374 A1 | 12/1986 |
| DE | 9318217 U1 | 4/1994 |
| DE | 69005404 T2 | 7/1994 |
| DE | 69005577 T2 | 7/1994 |
| DE | 4314615 C1 | 9/1994 |
| DE | 19541409 A1 | 5/1997 |
| DE | 19945291 A1 | 5/2001 |
| DE | 10321924 A1 | 12/2004 |
| DE | 102006032804 | 1/2008 |
| DE | 102008045553 | 3/2010 |
| EP | 0421791 A2 | 4/1991 |
| EP | 1477235 A2 | 11/2004 |
| EP | 1609532 A1 | 12/2005 |
| JP | H06165959 | 6/1994 |
| WO | 2010104972 A2 | 9/2010 |

* cited by examiner

COATING INSTALLATION AND CORRESPONDING OPERATING METHOD

CROSS-REFERENCE TO RELATED APPLICATIONS

This application is a National Phase of International Application No. PCT/EP2012/005091, filed on Dec. 10, 2012, which claims priority to German Application No. 10 2011 121 343.4, filed on Dec. 16, 2011, which applications are hereby incorporated by reference in their entirety.

Disclosed herein is a coating installation for coating components, in particular for painting aircraft components, and a corresponding operating method.

BACKGROUND

When painting aircraft components, both large components (e.g. wings) and small components (e.g. landing flaps, brackets, sheet metal, lugs, retainers, bulk material) must be painted, whereby the large components on the one hand and the small components on the other are painted spatially separately from each other in separate painting booths. The painting booths for the painting of wings are therefore adapted to the dimensions of the wings to be painted and are therefore extremely long, whilst the painting booths for painting the small components are considerably smaller.

A disadvantage of these known painting installations to paint aircraft components is the idling time of a painting robot in the large painting booth used to paint large components. The painting robot installed in the large painting booth idles for a relatively long period between individual painting processes. However, this painting robot nevertheless requires considerable investment and operating costs.

A mobile spray installation for viscous solutions (e.g. bitumen) is known from DD 241 374 A1 in which the coating device can alternate between two adjacent coating booths. The change between the two adjacent coating booths is time-consuming, however, and is effected by several crossing travel axes and is extremely complex. Further, this document belongs to a different technical area (bitumen application).

With respect to the state of the art, reference is furthermore made to DE 10 2008 045 553 A1, DE 690 05 404 T2, DE 690 05 577 T2, DE 195 41 409 A1, DE 43 14 615 C1, DE 103 21 924 A1, DE 93 18 217 U1, US 2007/0095279 A1, JP 06165959A and DE 10 2006 032 804 A1.

SUMMARY

A coating installation and a corresponding operating method are disclosed herein.

For example, it is disclosed herein to move a coating robot along a travel axis between different coating booths so that the coating robot can coat components in either one of the coating booths. This distinctly reduces the idling times of the moving coating robot because the coating robot can be deployed in the coating booth in which components are about to be coated.

The disclosure therefor includes a coating installation with a first coating booth which serves in particular to coat aircraft components and, for example, can be used to coat wings due to large dimensions of the first coating booth.

In addition, the coating installation has at least a second coating booth which may have considerably smaller dimensions than the first coating booth and, for example, can be used to coat small components (e.g. landing flaps, brackets, sheet metal, lugs, retainers, bulk material) of aircrafts.

In addition, the coating installation comprises a multi-axis coating robot which positions a coating device which is known from the state of the art. The coating robot may be a multi-axis coating robot with serial kinematics with, for example, six robot axes. However, with respect to the number of robot axes of the coating robot, the invention is not restricted to six robot axes but can also be realised with a different number of robot axes. For example, the coating robot can have 3, 4, 5, 6, 7 or even 8 robot axes. The possibility also exists within for the coating robot to have parallel kinematics instead of serial kinematics or even in addition to them. The use of a multi-axis coating robot has the advantage that the spray jet of the coating agent (e.g. paint) dispensed by the coating device (e.g. rotary atomizer) can always be aligned, even in the case of curved component surfaces, at right angle to the component surface or parallel to the surface normal.

As already briefly mentioned above, the coating device may be a rotary atomizer as known from the state of the art. However, other types of atomizers can also be used as a coating device such as, for example, compressed-air atomizers, airless devices, airmix devices or ultrasonic atomizers.

Further, the coating installation is suitable both for the application of powder paint and the application of wet paint. Further, solvent-based or water-based paints can be applied using the inventive coating installation. The possibility also exists for single-component paints or multi-component paints to be applied which, for example, can have 2, 3, 4 or even 5 different paint components.

In addition, the coating installation has a travel axis along which the coating robot can be moved, whereby such travel axes are similarly known from the state of the art. The travel axis is therefore usually a rail arrangement on which the coating robot can be moved. It is to be mentioned here that the travel axis is preferably linear in order to facilitate a linear travel movement of the coating robot along the travel axis. However, the travel axis can also basically be curved in order to facilitate a curved travel movement of the coating robot along the travel axis.

The travel axis may extend from the first coating booth to the second coating booth so that the coating robot can coat components either in the first coating booth or in the second coating booth. For example, the coating robot can first be positioned in the first coating booth in order to coat large components (e.g. wings) there. In the break between the coating of two such large components the coating robot can be moved to the second coating booth along the travel axis where it can coat small components (e.g. landing flaps, brackets, sheet metal, lugs, retainers, bulk material). In this manner the coating robot can be deployed even in the coating breaks between the coating of two components in order to coat small components in the other coating booth, thereby considerably reducing the idling times of the coating robot. In the coating installation, the temporal degree of capacity utilisation of the coating robot is therefore considerably better than in traditional coating installations described above.

In addition, the inventive coating installation may have conveyers to feed in or out the components to be coated into the respective coating booths. Different types of conveyers may be used here, such as suspended conveyers, horizontal conveyers or transfer stations which are known from the state of the art and which do not therefore need to be described in greater detail herein.

Further, the conveyers are continuous conveyers with a continuous component flow or non-continuous conveyers which also facilitate stop-and-go operation.

Furthermore, the possibility exists for at least one of the conveyers to be a unidirectional conveyer which conveys the components in only one direction through the respective coating booth so that the components enter the respective coating booth through an inlet and exit the respective coating booth through an opposite outlet.

Alternatively, the possibility exists for at least one of the conveyers to be a bidirectional conveyer so that the components enter the respective coating booth in one direction and exit the respective coating booth in an opposite direction.

Different possibilities exist with respect to the geometrical arrangement of the coating booths, the conveyers and the travel axis, some of which are described briefly in the following.

Therefore, the first conveyer can be arranged transversely to the second conveyer and, in particular, at right angles to it. In an arrangement of this type, the travel axis may also be aligned for the coating robot along the first conveyer and in particular parallel thereto. In addition, the travel axis may be arranged transversely to the second conveyer and in particular at right angles to it.

In an orthogonal arrangement of this type of the coating booths and the corresponding conveyers, the second conveyer and the travel axis for the coating robot can cross. Therefore, the travel axis for the coating robot may be raised above the second conveyer so that the components to be coated can be conveyed by the second conveyer beneath the travel axis for the coating robot. This can be realised technically, for example, such that the travel axis is arranged in the form of a raised rail ("elevated rail").

In an embodiment, the first coating booth for the coating of large components has a side wall, whereby the travel axis for the coating robot is arranged at the side wall of the coating booth. One possibility here is for the side wall of the coating booth itself to form a load bearing structure and so can therefore bear the travel axis for the coating robot. By contrast, another possibility is for a load bearing structure to be provided for the travel axis on the outer side of the side wall, whereby the side wall of the coating booth merely forms a separating wall without assuming any load bearing function.

It has already been mentioned above that the first coating booth preferably serves to coat large components (e.g. wings) of aircraft and therefore in terms of its dimensions is adapted to such large components. Therefore, in the first coating booth, the booth length may be considerably greater than the booth width, whereby the booth length may be greater than 10 m, 12 m or even 15 m. It is also to be mentioned that the first coating booth may be considerably larger than the second coating booth because the first coating booth serves preferably to coat large components whilst possibly small components (e.g. landing flaps, brackets, sheet metal, lugs, retainers, bulk material) are coated in the second coating booth. In addition, the first coating booth may be considerably higher than the second coating booth. The first coating booth can, for example, be of a height which is greater than 5 m, 6 m or even 7 m, whilst the second coating booth can have a height which is smaller than 6 m, 5 m, or even smaller than 4 m.

Furthermore, the two coating booths of the inventive coating installation can be adjacent directly to each other. The possibility exist alternatively, however, for the two coating booths to be spatially separated from each other, whereby the distance between the two coating booths is bridged by the common travel axis.

In the case of the directly adjacent arrangement of the coating booths, a partition may be provided between the coating booths but the possibility also exists for an open transition from the one coating booth to the adjacent other coating booth. The above-mentioned partition of the adjacent coating booths can, for example, be effected by a door (e.g. roller door, sliding door etc.) which can be driven either pneumatically, hydraulically or electrically. The possibility furthermore exists for the adjacent coating booths to be separated by an airlock.

The term "coating booth" used herein may be an essentially closed coating booth which is closed apart from the inlet and the outlet. The term "coating booth" used herein is, however, to be generally understood and also comprises processing stations which are at least partly open.

In an embodiment, the coating booth has booth ventilation which is responsible jointly for the different coating booths and provides their ventilation. With respect to the ventilation of the coating booths, different possibilities are provided such as a so-called horizontal plenum or a traditional filter ceiling which may be divided into sections. Instead of a so-called horizontal plenum, a so-called vertical plenum can be used or so-called range nozzles can be deployed.

In addition, the coating installation in an embodiment has a paint supply which jointly supplies the different coating booths with the coating agent (e.g. paint of a specific colour).

Furthermore, a central supply device may be used to dispose of the surplus coating agent ("over-spray") from the different coating booths. Different possibilities are provided for the technical realisation of the disposal device. For example, dry disposable filters, dry scrubbers can be used or Venturi scrubber method as well as the use of a so-called "wet trough".

In addition, the coating installation can have an additional drying station, whereby different possibilities exist with respect to the technical realisation of a drying station of this type. For example, a circulating air convection dryer, an infrared dryer, an infrared convection dryer or a different type of dryer can be used.

Similarly there are different possibilities with respect to the spatial position of the disposal device. For example, the disposal device can be arranged in a booth floor of the coating booth, whereby the disposal device can extend over only a part of the booth floor or over the entire booth floor. Alternatively, the possibility exists for the disposal device to be arranged in the side wall of the coating booth, whereby the disposal device can extend once again either over only one part of the side wall or over the entire side wall.

In addition to the above-described coating installation, a corresponding operating method is disclosed in which a coating robot is moved on the travel axis between the different coating booths in order to consecutively coat components in the different coating booths.

Further, the disclosed subject matter is not restricted to the coating of aircraft components. Rather, the concept is also suitable for coating other components such as vehicle chassis components, components of wind turbines (e.g. rotary blades) etc.

BRIEF DESCRIPTION OF THE DRAWINGS

Other advantageous further embodiments are marked in the sub-claims and are explained in greater detail below together with the description of the preferred embodiments of the invention using the figures:

DETAILED DESCRIPTION OF EXEMPLARY EMBODIMENTS

Figure 1A:
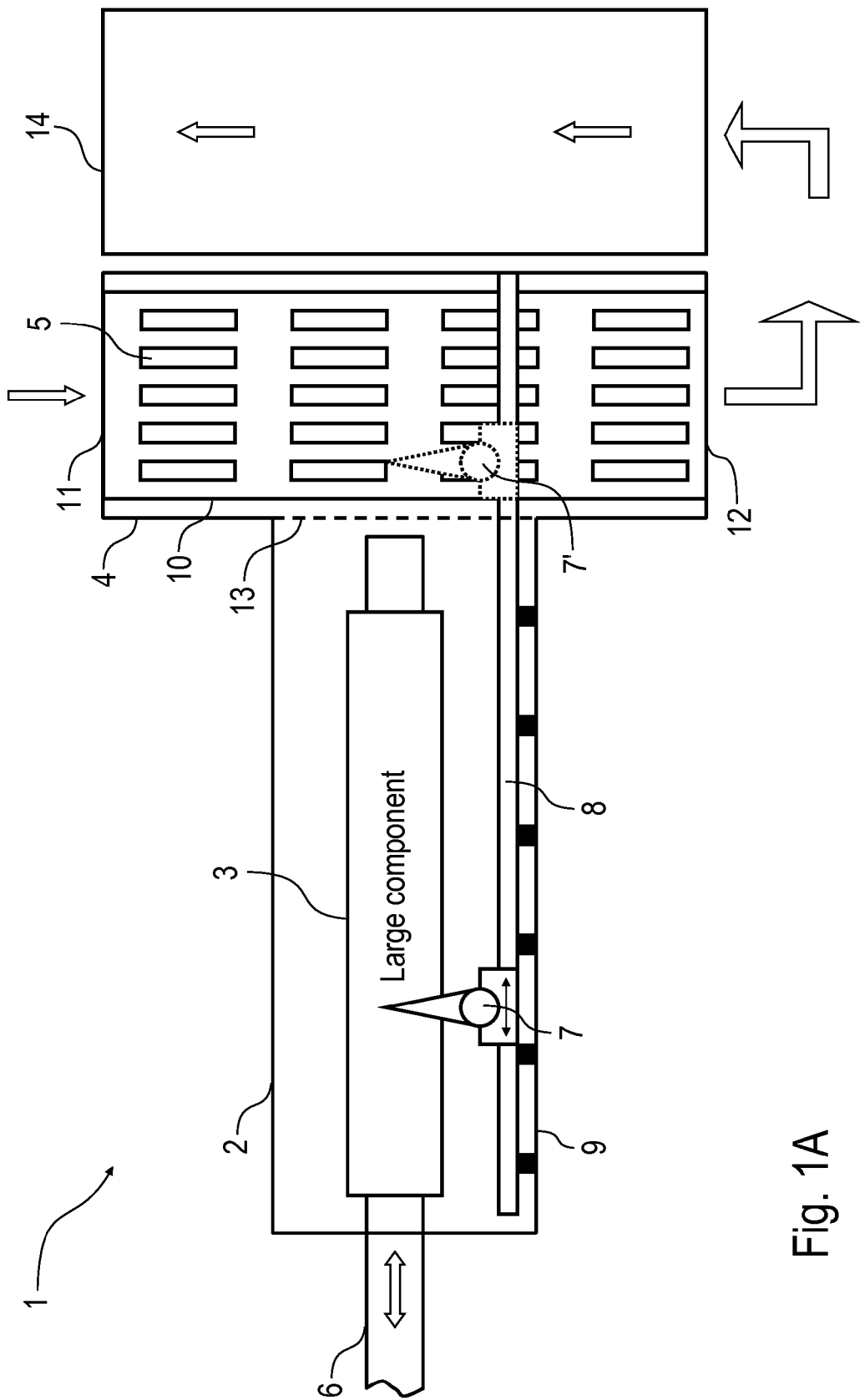
FIG. 1A a diagrammatic illustration of an exemplary coating installation to coat aircraft components.
Figure 1B:
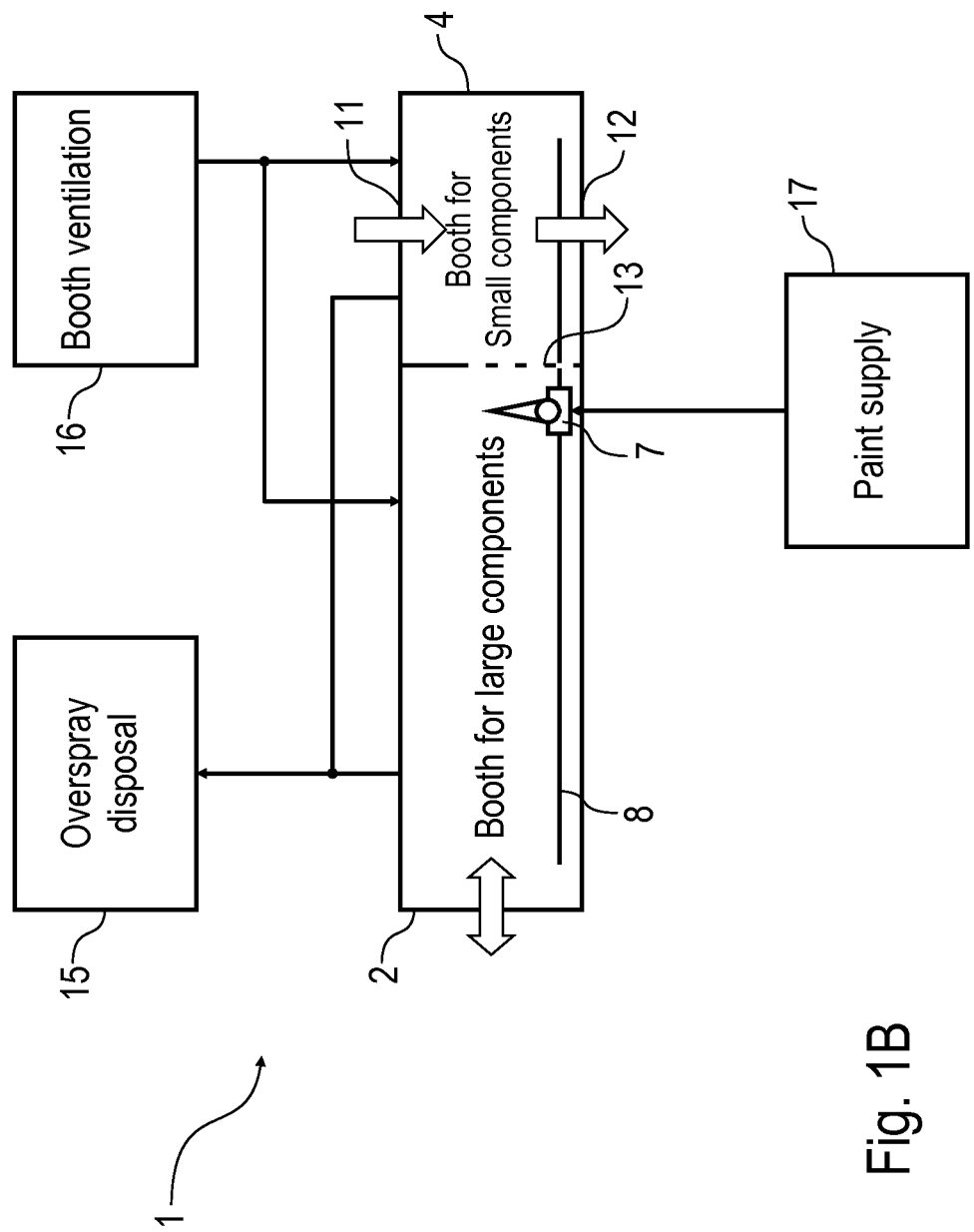
FIG. 1B a diagrammatic illustration of the coating installation from FIG. 1A with overspray disposal, booth ventilation and paint supply.

FIGS. 1A and 1B show an exemplary painting installation 1 for the painting of aircraft components with a first painting booth 2 for the painting of large components 3 (e.g. wings) and a second painting booth 4 for the painting of small components 5 (e.g. landing flaps, brackets, sheet metal, lugs, retainers, bulk material).

In term of dimensions, painting booth 2 has been adjusted to the large components 3 to be painted and therefore has a relatively large booth length of approximately 15 m and a booth height of 7 m with a booth width of 5 m.

By contrast, the other painting booth 4 is considerably smaller in dimension in accordance with the dimensions of the small components 5 to be painted.

In addition, the painting installation 1 has a conveyer 6 in order to feed the large components 3 into the painting booth 2 and to convey them out again from the painting booth 2 after a coating process.

Furthermore, the painting installation 1 has a painting robot 7 which can be moved along a travel rail 8 between the two painting booths 2, 4 so that the painting robot 7 can paint the large components 3 in the painting booth 2 or the small components 5 in the painting booth 4. In order to paint the small components 5 in the painting booth 4, the painting robot 7 is therefore moved along the travel rail 8 in a position 7' shown by a dotted line which is in the painting booth 4.

The travel rail 8 for the painting robot 7 is attached to a side wall 9 of the painting booth 2 and extends from the first painting booth 2 to the painting booth 4 so that the painting robot 7 can paint the small components 5 there.

A conveyer 10 runs through the painting booth 4 which conveys the small components 5 through an inlet 11 into the painting booth 4 and conveys the small components 5 through an outlet 12 out of painting booth 4.

The travel rail 8 for the painting robot 7 runs at right angles to the conveyer 10 in the painting booth 4 so that the travel rail 8 and the conveyer 10 cross in the painting booth 4. The travel rail 8 is therefore raised over the conveyer 10 so that the small components 5 on the conveyer 10 can be conveyed beneath the travel rail 8.

There is a partition 13 between the two painting booths 2, 4 which can, for example, consist of a roller door, a sliding door or an airlock which is known from the state of the art and does not therefore need to be described in more detail.

The painting installation also can have a drying station 14 in order to dry the small components 5 after painting in the painting booth 4, whereby the drying station 14 can be designed in a traditional manner.

Further, the painting installation 1 has a central overspray disposal unit 15 which is responsible both for the painting booth 2 and for the painting booth 4 and disposes of overspray from the two painting booths 2, 4.

In addition, the painting installation 1 also has a central booth ventilation 16 which is responsible for both the painting booth 2 and the painting booth 4 and provides adequate ventilation in the painting booths 2, 4, whereby ventilation can be provided in a traditional manner and does not therefore need to be described in more detail.

Finally, the painting installation 1 also has a central paint supply 17 which is responsible both for the painting booth 2 and for the painting booth 4.

An advantageous aspect of the painting installation 1 is the fact that the painting robot 7 can be used both in the painting booth 2 and in the painting booth 4 so that the idling times of the painting robot 7 in coating breaks are reduced, leading to a reduction in investment and operating costs.

Figure 2:
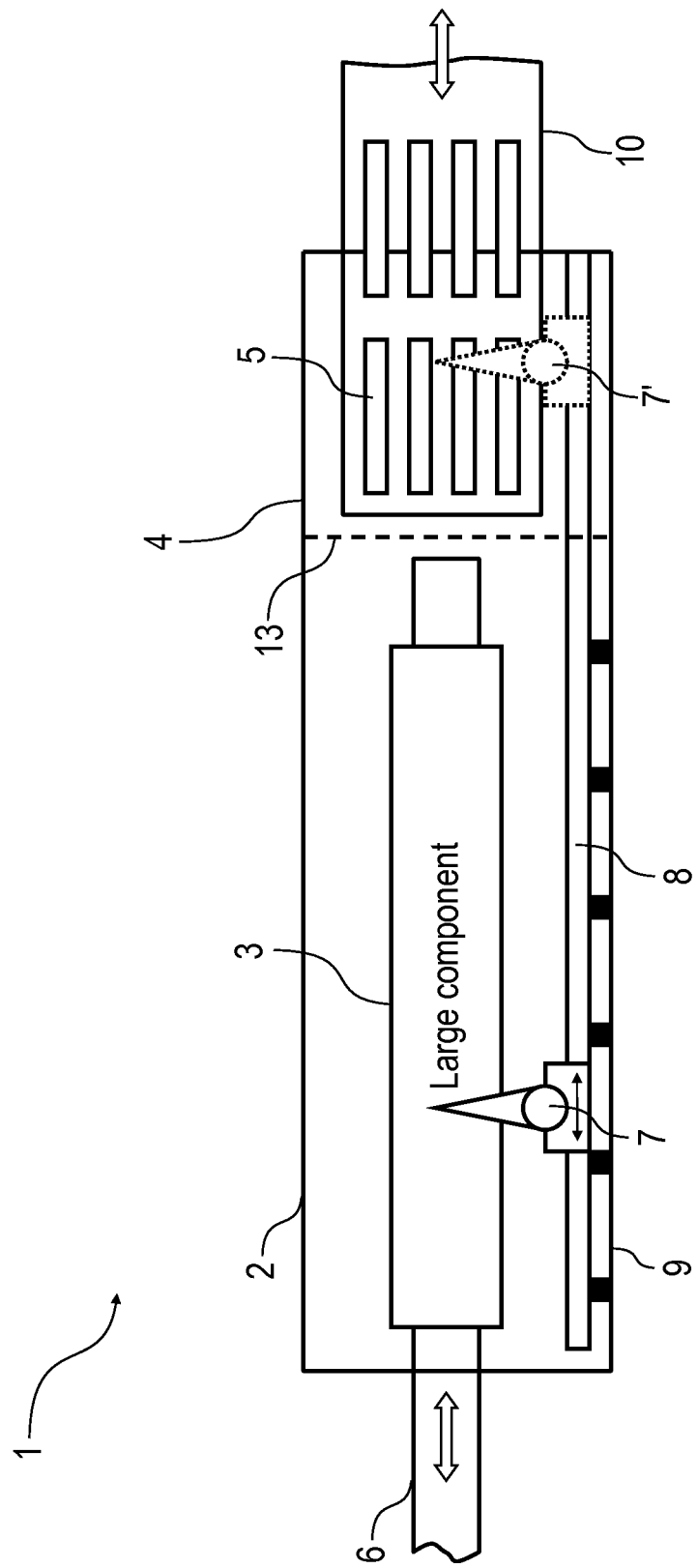
FIG. 2 an alternative embodiment of an exemplary painting installation with a sequential arrangement of the painting booths.

FIG. 2 shows a modification of the embodiment in accordance with FIGS. 1A and 1B, whereby this modification essentially corresponds to the above-described embodiment so that reference is made to the above description to avoid repetition, whereby the same reference numbers are used for the corresponding details.

A special feature of this embodiment is that the two painting booths 2, 4 are not arranged orthogonally as in FIGS. 1A and 1B but sequentially.

In accordance with this sequential arrangement, the conveyer 10 for the painting booth 4 is designed as a bidirectional conveyer which conveys the small components 5 in one direction into the painting booth 4 and conveys them out again in an opposite direction from the painting booth.

Figure 3:
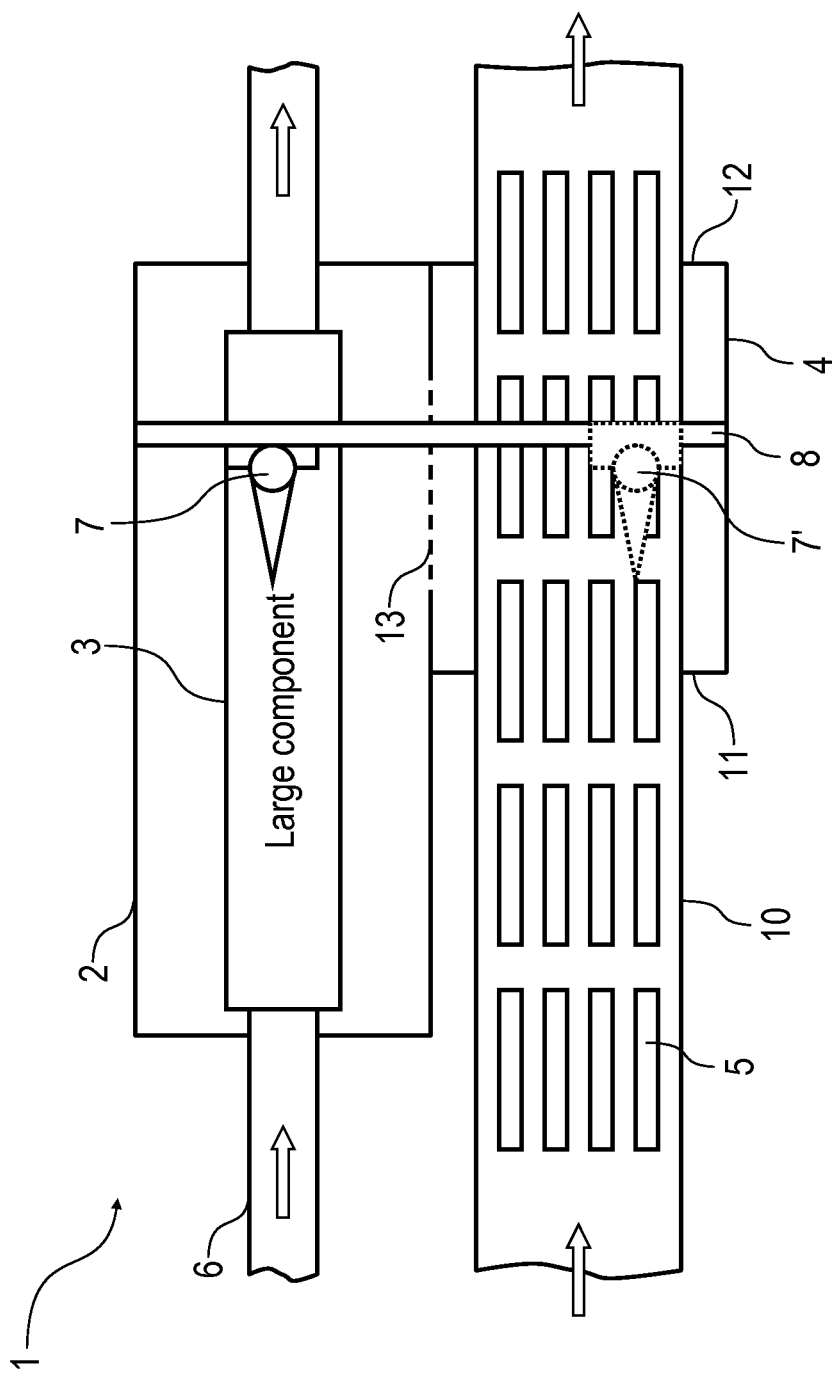
FIG. 3 an alternative embodiment with a parallel arrangement of the painting booths.

FIG. 3 shows a further modification of the above-described embodiment for FIGS. 1A and 1B so that once again reference is made to the above description to avoid repetitions, whereby the same reference numbers are used for the corresponding details.

A special feature for this embodiment is that the two painting booths 2, 4 are not arranged orthogonally as in FIGS. 1A, 1B or sequentially as in FIG. 2 but rather parallel to each other.

Accordingly, the two conveyers 6, 10 are arranged parallel to each other and are provided as pass-through conveyers, i.e. they convey the respective components through an inlet into the respective painting booth 2 or 4 and out of the respective painting booth 2 or 4 through an opposite outlet.

In addition, the travel rail 8 for the painting robot 7 is arranged at right angles to the two conveyers 6, 10 so that the painting robot 7 can be moved at right angles to the conveyers 6, 10 from the painting booth 2 into the painting booth 4 and vice versa.

Figure 4:
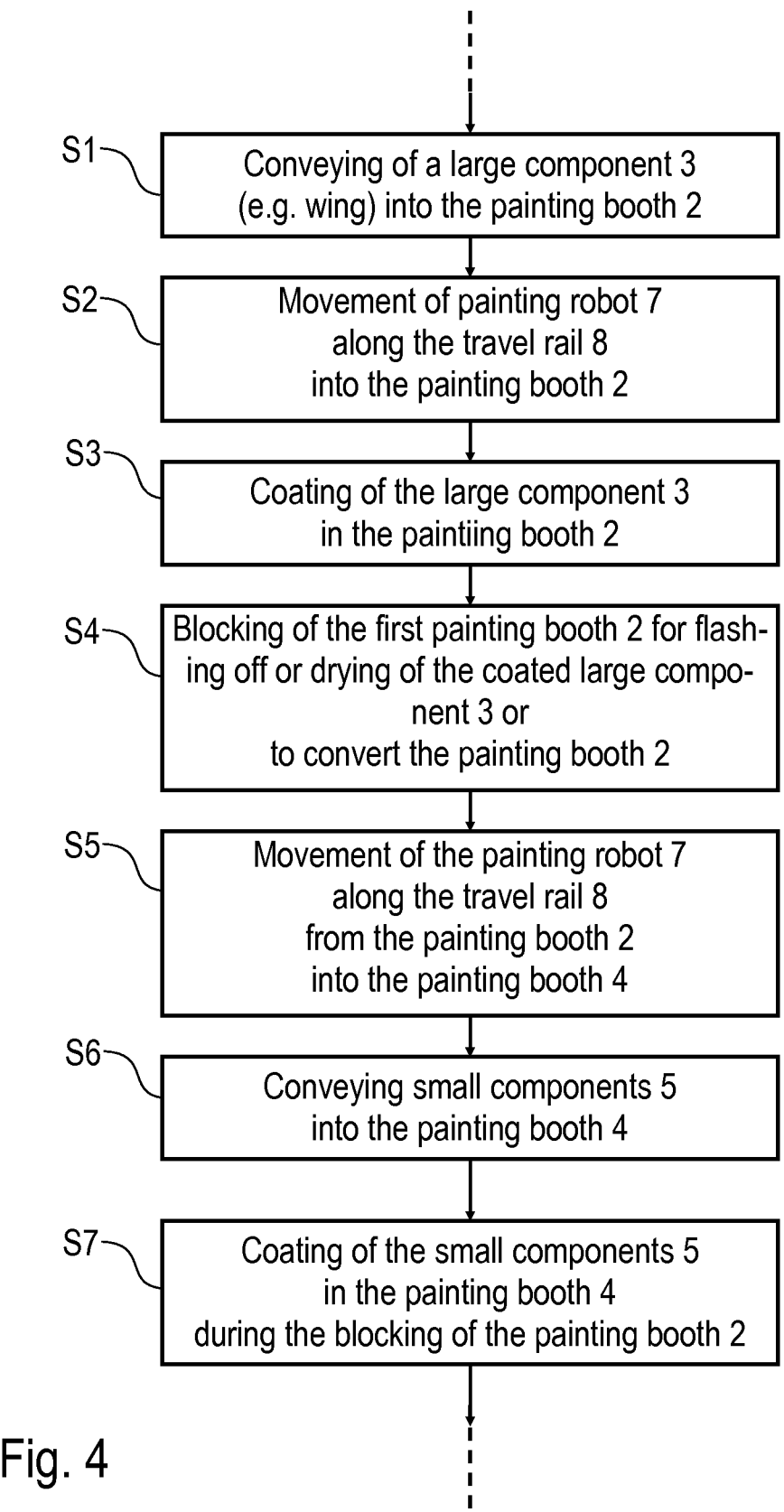
FIG. 4 an operating method in the form of a flow chart.

The operating method of the painting installation 1 is now described in the following, making reference to the flow chart in FIG. 4.

In a first step S1 the large component 3 is firstly conveyed into the painting booth 2 (Step S1).

The painting robot 7 is then moved along the travel rail 8 into the painting booth 2 (Step S2).

The large component 3 is then painted by the painting robot 7 in the painting booth 2 (Step S3).

After completion of painting of the large component 3 in the painting booth 2, the painting booth 2 is then blocked for an immediate further painting so that the coated component 3 in the painting booth 2 can flash off or dry. In addition, the blocking of the painting booth 2 can also be effected in order to convert the painting booth 2 (Step S4).

Finally, the painting robot 7 is then moved along the travel rail 8 from the painting booth 2 into the other painting booth 4 (Step S5).

Furthermore, small components 5 are then conveyed by the conveyer 10 into the painting booth 4 (Step S6).

Finally, the small components 5 are then painted in the painting booth 4 by the painting robot 7 (Step S7).

The invention is not restricted to the above-described preferred embodiments. Rather, a large number of versions and modifications are possible which similarly make use of the inventive concept and which therefore fall within the protective area. In addition, the invention also claims protection for the subject matter and features of the sub-claims irrespective of the features of the claims referred to.

The invention claimed is:

1. A coating installation comprising:
a first coating booth;
a multi-axis coating robot that positions a coating device;
a travel axis to move the coating robot along the travel axis, whereby the travel axis runs within the first coating booth;
a second coating booth;
a first conveyer to convey the components to be coated into the first coating booth and to convey the components to be coated out of the first coating booth, and
a second conveyer to convey the components to be coated into the second coating booth and to convey the components to be coated out of the second coating booth;
wherein the first conveyer is aligned transversely to the second conveyer and the second coating booth is aligned transversely with the first coating booth; and
wherein the travel axis for the coating robot extends into the second coating booth so that the coating robot can coat components either in the first coating booth or in the second coating booth.

2. The coating installation of claim 1,
wherein at least one of the first conveyer and the second conveyer is a unidirectional conveyer that conveys the components in only one conveying direction through a coating booth so that the components enter the coating booth through an inlet and exit the coating booth through an opposite outlet.

3. The coating installation of claim 1, wherein at least one of the first conveyer and the second conveyer is a bidirectional conveyer so that the components enter a coating booth in one conveying direction and exit the coating booth in an opposite conveying direction.

4. The coating installation of claim 1, wherein the travel axis for the coating robot is aligned along the first conveyer.

5. The coating installation of claim 4, wherein the travel axis for the coating robot is aligned transversely to the second conveyer.

6. The coating installation of claim 5, wherein the second conveyer and the travel axis for the coating robot intersect.

7. The coating installation according to claim 6, wherein the travel axis for the coating robot runs above the second conveyer so that the components to be coated may be conveyed by the second conveyer beneath the travel axis for the coating robot.

8. The coating installation of claim 1,
wherein the first coating booth has a side wall and the travel axis for the coating robot is attached to the side wall of the first coating booth.

9. The coating installation of claim 1, wherein:
the first coating booth has a certain booth length along the travel axis of the coating robot and a certain booth width transversely to the travel axis of the coating robot,
in the case of the first coating booth, the booth length is greater than the booth width, and
the first coating booth has a booth length of at least 10 m, and
the first coating booth is larger than the second coating booth in order to coat large components in the first coating booth and small components in the second coating booth.

10. The coating installation according to claim 9, wherein the first coating booth is higher than the second coating booth.

11. The coating installation of claim 1, further comprising a partition between the first coating booth and the second coating booth.

12. The coating installation of claim 1, further comprising an open transition from the first coating booth to the second coating booth.

13. The coating installation of claim 11, wherein the partition between the first coating booth and the second coating booth comprises a component selected from the group consisting of a roller door, an airlock, and a sliding door.

14. The coating installation of claim 1, wherein the first coating booth and the second coating booth are essentially closed with the exception of an inlet and an outlet.

15. The coating installation of claim 1, wherein the first coating booth and the second coating booth are at least partially open.

16. The coating installation of claim 1, further comprising a booth ventilation that ventilates both the first coating booth and the second coating booth.

17. The coating installation of claim 1, further comprising a paint supply that supplies each of the first coating booth and the second coating booth with the coating agent.

18. The coating installation of claim 1, further comprising a disposal unit to dispose overspray both from the first coating booth and from the second coating booth.

* * * * *